United States Patent [19]

Vogel

[11] Patent Number: 5,380,048

[45] Date of Patent: Jan. 10, 1995

[54] TUBE JOINT

[75] Inventor: Kenneth E. Vogel, Yuma, Ariz.

[73] Assignee: Russell A Division of Ardco, Inc., Brea, Calif.

[21] Appl. No.: 931,852

[22] Filed: Aug. 18, 1992

[51] Int. Cl.⁶ ............................................. F16L 13/08
[52] U.S. Cl. ..................... 285/22; 285/287; 285/290; 285/286; 228/154; 228/183
[58] Field of Search ................ 285/286, 287, 22, 290; 228/154, 165, 174, 258, 183; 29/890.043

[56] References Cited

U.S. PATENT DOCUMENTS

| | | | |
|---|---|---|---|
| 284,146 | 8/1883 | Russell et al. | 285/290 |
| 1,618,611 | 2/1927 | Trout . | |
| 1,903,315 | 4/1933 | Priebe | 285/22 |
| 2,324,335 | 7/1943 | Taylor | 285/22 |
| 3,012,317 | 12/1961 | Wolfe | 228/154 |
| 3,048,104 | 8/1962 | Riggs | 228/165 |
| 3,290,772 | 12/1966 | Crouch . | |
| 3,677,580 | 7/1972 | Klanke | 285/22 |
| 3,833,986 | 9/1974 | DeCicco . | |
| 3,957,289 | 5/1976 | Kilgore et al. . | |
| 4,077,559 | 3/1978 | Watson, Jr. | 228/165 |
| 4,135,740 | 1/1979 | Watson, Jr. . | |
| 4,900,049 | 2/1990 | Tseng | 228/154 |
| 5,101,889 | 4/1992 | Potier | 228/154 |
| 5,116,087 | 5/1992 | Hopperdietzel | 285/286 |
| 5,251,714 | 10/1993 | Murofushi | 285/22 |

FOREIGN PATENT DOCUMENTS

| | | | |
|---|---|---|---|
| 973983 | 2/1951 | France | 228/154 |
| 2285953 | 4/1976 | France | 228/154 |
| 402705 | 3/1943 | Italy | 228/165 |
| 6077 | of 1885 | United Kingdom | 285/290 |
| 10923 | of 1895 | United Kingdom . | |
| 26168 | of 1897 | United Kingdom . | |

OTHER PUBLICATIONS

Article entitled "HCFC-22 Cure-All or Liability?", by Ken Vogel, Contracting Business, Sep. 1991, pp. 83 and 87.

Primary Examiner—Eric K. Nicholson
Attorney, Agent, or Firm—Knobbe, Martens, Olson & Bear

[57] ABSTRACT

Circumferentially spaced bosses concentrically position a male tube end within a female tube end. The bosses have a preferred shape which permits molten brazing material to flow evenly between the tubes, ensuring a void-free joint. The bosses provide a relief clearance at the mouth of the male tube to allow the formation of a continuous annular band of brazing material at this end. Stop tapers on the bosses allow the female tube to be pressed onto the male tube for stability prior to brazing. The bosses also limit the overlap of the two tubes to a maximum distance, ensuring adequate heat conduction to the innermost portion of the male tube. Spacers, integral with the bosses, form an axial gap between the tubes into which the brazing rod more readily melts.

19 Claims, 5 Drawing Sheets

TUBE JOINT

BACKGROUND OF THE INVENTION

The present invention relates to metal pipe joints and, more particularly, to improved means for joining return bend connectors to heat exchange tubes of heat exchangers such as in refrigeration equipment.

Typically, refrigeration heat exchangers are made with U-bend coils arranged in serpentine fashion in a matrix of spaced metal heat transfer fins. Often, the coils are made of copper tubing. A refrigerant circulates through the tubes absorbing heat from air passed over the fins, thus cooling the air via convective heat transfer.

The joints between the tubular members of a heat exchange unit must provide a refrigerant-tight seal to ensure the integrity of the system. Commonly, the ends of the tubes being joined together are fit in concentric relation with one overlapping the other, in a telescopic fashion. A brazing material is used to fill the space between the overlapping ends. While it is desirable to employ relatively large clearances in the joint to facilitate the flow of brazing material, too large a gap makes it difficult to provide even penetration of the weld. Similarly, a minimum clearance is necessary to allow the brazing material to flow. Preferably, the clearance is such that the brazing material is pulled into the annular gap between the tubes by a capillary action. It is normally required that the resulting joint be as strong or stronger than the surrounding tubing to avoid providing a weak spot prone to structural failure. In addition, it is critically important to ensure the quality of the brazed joint to avoid subsequent corrosion and other problems resulting in leakage from the joint.

Several prior methods for soldering telescopic joints in serpentine tubing have involved centering the male member within the female member by providing outstanding nibs around the periphery of the male member. Such methods are shown in patents to DeCicco (U.S. Pat. No. 3,833,986), Watson, Jr. (U.S. Pat. No. 4,135,740), and Kilgore, et al. (U.S. Pat. No. 3,957,289). The primary focus of these prior methods has been to provide a frictional interference fit between the male member and the female member so that the U-shaped member on the end of the elongated tubes may be inverted and immersed into a solder bath. Watson and Kilgore both disclose axial grooves cut into the ends of the U-bends to allow the escape of hot gases from the solder process. These grooves can lead to irregularities in the circumferential quality of the soldered joint. The patent to DeCicco does not address the location or shape of the protruding nibs on the male member, the purpose of the nibs simply being to engage the interior of the female member in a frictional relationship.

The general brazing industry guideline has been that brazed joints should have axial "penetration equivalent to three times the thickness of the thinnest member being joined"—to meet strength and pressure requirements. Common practice is to exceed the minimum axial overlap to create a stronger joint under the general assumption that more is better. Additionally, prior techniques have not attempted to ensure the consistency of the amount of axial overlap.

Leakage of refrigerants has always been a concern for proper operation, safety and maintenance reasons, but has lately assumed more ominous, global implications. Refrigerants, once released, eventually disperse and rise into the ozonosphere. Widely used chlorofluorocarbon compounds, such as CFC-12 and R-512, break down under the sun's energy and release chlorine gas ($Cl_2$). The freed chlorine molecules split and the chlorine atoms attach to the third oxygen atom in ozone ($O_3$) forming ClO and $O_2$. Recently, with the acknowledgment that this process measurably depletes the crucial ozone concentration of our planet's atmosphere, the search for refrigerant alternatives has intensified.

One such alternative, HCFC-22, long used in high-temperature cooling applications such as air-conditioning, has been promoted as the alternative refrigerant of choice to use on all new medium and low temperature applications in commercial refrigeration. Although switching to HCFC-22 at first glance alleviates environmental damage, serious problems have cropped up with the refrigerant leaking heavily from low-temperature systems. Losing large amounts of HCFC-22 into the atmosphere is, in itself, a major concern.

The present invention identifies and cures the cause of excessive leaking of alternative refrigerants from low-temperature systems by providing an improved pipe brazing structure which substantially eliminates the problems associated with prior art brazing techniques.

SUMMARY OF THE INVENTION

The inventor has recently discovered that the greater solubility of water in refrigerants such as HCFC-22 has been the cause of an increase in the number of leaks forming at the brazed joints of refrigeration coils. The increased presence of water in refrigerators with a defroster exacerbates a leak producing process similar to the freeze/thaw cycle which destroys roads in the winter. The water melts during each defrost and moves into any tiny internal cracks and crevices in the joints between coil members. There, it is trapped, refreezes, and expands the size of the crack or cavity. Repeating this cycle causes the cavity to enlarge, and blister until a rupture occurs, resulting in a major refrigerant leak.

HCFC-22 releases ten times more water than CFC-12 and 2-½ times more water than R-502, as it cools from 100° F. to a low side temperature of −20° F. HCFC-22 also holds more moisture in its liquid state, as opposed to CFC-12 which holds more in its vapor state. With HCFC-22, the liquid's higher affinity for moisture prevents moisture from leaving with the vapor as the refrigerant boils off. The residual liquid becomes wetter until most of the moisture in the evaporator separates as free water in the form of ice, which remains in the coil. In systems with a subsequent thaw cycle, such as an electric or air defrost, the water has a chance to seep into voids in poorly brazed joints.

Voids or cavities will be found in telescopic joints wherever 100% penetration of the brazing material is not achieved, or where a void exists in a thin, unbrazed pathway to the inside of the tube. Reducing the length of axial overlap to minimum structural requirements facilitates the flow of brazing material between the tubes being joined to more completely reach the innermost portion of the joint.

The present invention provides structure for positioning the end of one tube within the end of a second tube for the purpose of effectively brazing the tubes together. Typically, such brazed joints exist at the junction of sections of copper coil in refrigeration devices. Small U-shaped bend sections and long straight sections couple to form a continuous serpentine path for refrigerant to flow.

In a preferred form of the invention, the end of the male tube is swaged to a reduced diameter to fit within the end of a female tube. Bosses or ribs spaced around the reduced area of the male tube provide the sole point of contact with the female tube, and thus control the precise relationship between the two tubes. The bosses hold the female tube concentric about the male tube, and the amount of axial overlap between the two tubes is consistently ensured by stops formed on the bosses. The stops also provide a means for joining the two tubes together in an interference fit prior to brazing. A relief volume into which molten brazing material may flow is formed by the bosses in a continuous band around the portion of the male tube farthest within the female tube. A gap between the female tube and the body of the male tube is created by the bosses which communicates with the inner relief volume and facilitates the rapid application of a large quantity of brazing material.

In accordance with the preferred embodiment of the brazing structure, three evenly spaced bosses extend axially from the mouth of the male tube the entire length of the reduced area to provide three-dimensional control of the contact between the two tubes. The bosses include land portions lying parallel to the longitudinal axis of the joining tubes sized to receive the interior diameter of the female tube. The bosses also include steps which taper out to full diameter bridges. The mouth of the female tube engages these steps to limit the overlap and to ensure a frictional fit during brazing. The lands and the steps form the only portions of the male tube which contact the interior of the female tube. Thus, brazing material may freely flow in all other areas of the overlapped tubes.

BRIEF DESCRIPTION OF THE INVENTION

DETAILED DESCRIPTION OF THE INVENTION

Figure 1:
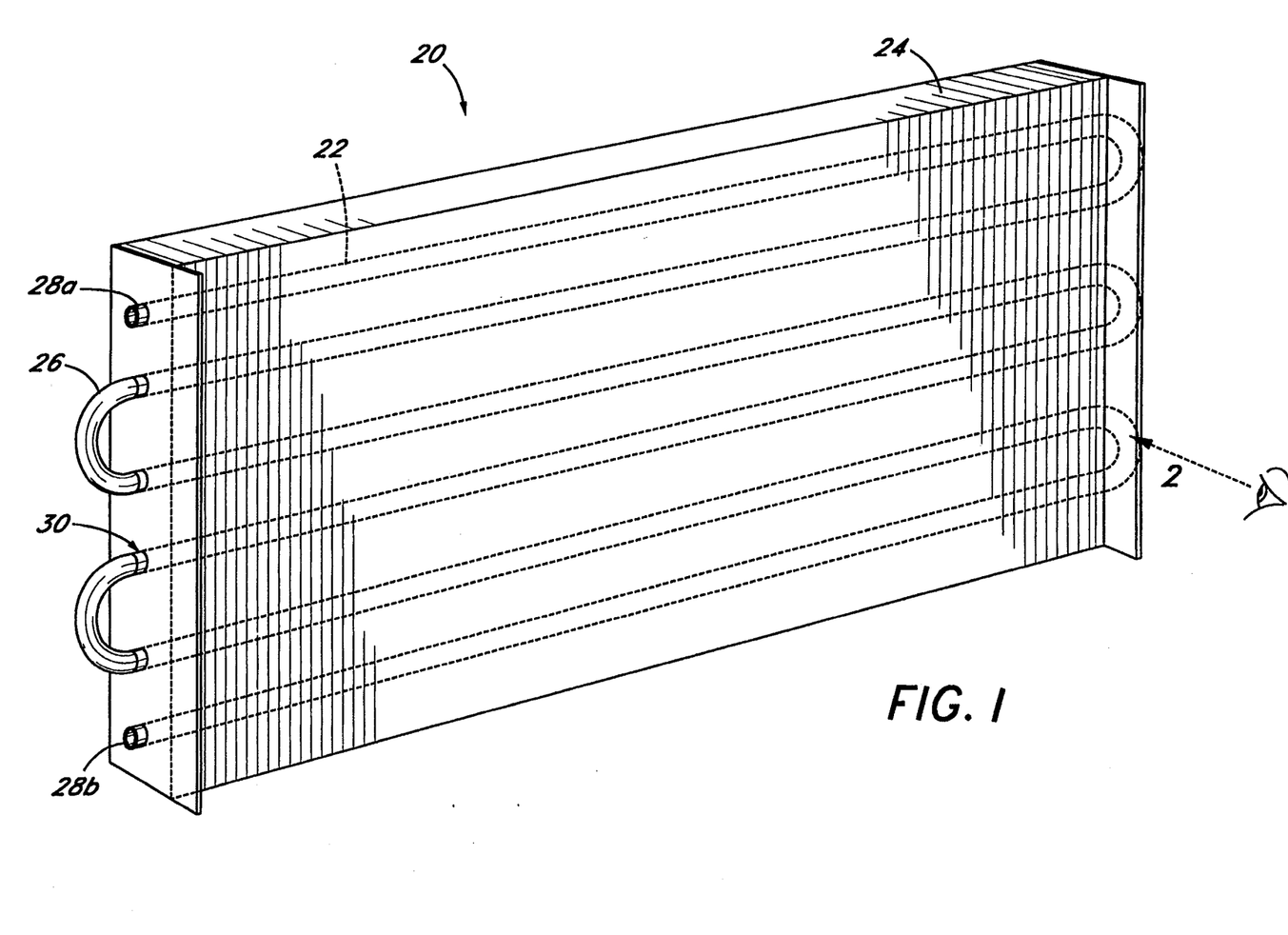
FIG. 1 is a perspective view of a typical heat exchanger whose sections are brazed using the telescopic joint coupling of the present invention.

This invention is illustrated in connection with a tube and fin condenser adapted for use in refrigerators and freezers. As shown in FIG. 1, the condenser 20 includes tubing which has traditionally been described as refrigerant coils and which is illustrated in a serpentine arrangement. The serpentine arrangement is provided by a plurality of relatively long tubular members 22 passing perpendicularly through a matrix of heat conducting fins 24. The open ends of the adjacent tubular members 22 are connected by shorter U-shaped return bends 26. An inlet 28a and an outlet 28b to the continuous serpentine tube system deliver and receive, respectively, a suitable refrigerant. The U-shaped return bends 26 are typically coupled to the long tubular members 22 at telescopic joints 30 wherein one tube end fits concentrically within another larger tube end. The area between the tubes 22, 26 at the joints 30 is filled with molten brazing material (not shown) which flows between the two members and solidifies, creating a solid interface.

Figure 2:
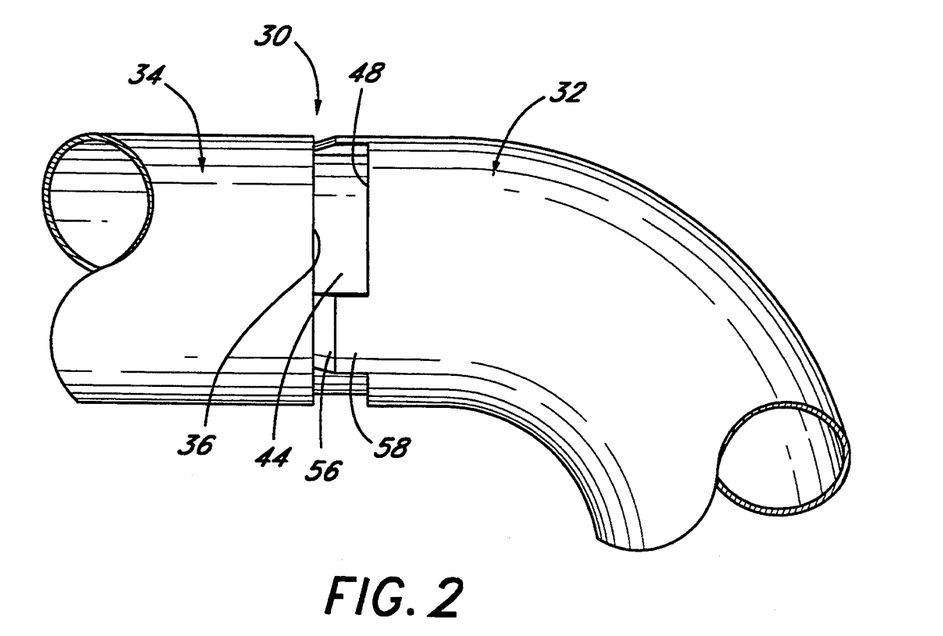
FIG. 2 is a side elevational view of the telescopic joint of FIG. 1.
Figure 3:
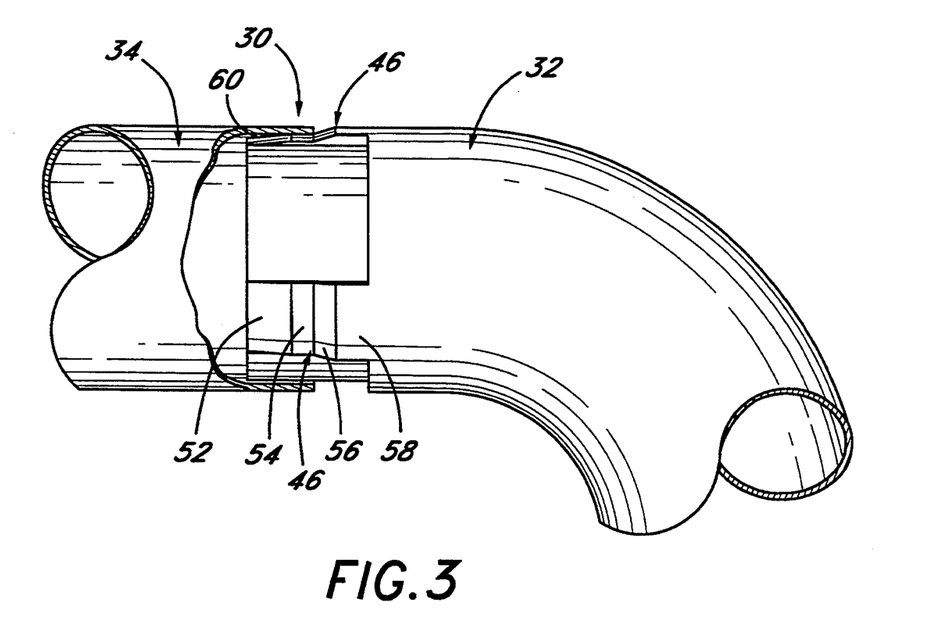
FIG. 3 is a cutaway view of the telescopic joint of FIG. 1 showing the male component extending within the female component.

Referring to FIGS. 2 and 3, the telescopic joint 30 includes a male or inner member 32 whose end section has a reduced outside diameter. The male member 32 inserts into an outer or female member 34 a certain distance at which point the brazing material (not shown) is added. Preferably, the U-shaped return bends 26 include two male ends 32 which insert into the female ends 34 of the long tubes 22, creating the serpentine arrangement. The preferred arrangement could be reversed, however, and the ends of the long tubes 22 be reduced to form a male member 32. FIGS. 2 and 3 show the telescopic joint 30 prior to brazing. The distal end of the male member inserts concentrically in the forward end 36 of the female member a sufficient distance to cause an interference fit to hold the members 32, 34 in the desired relationship prior to joining.

Figure 4:
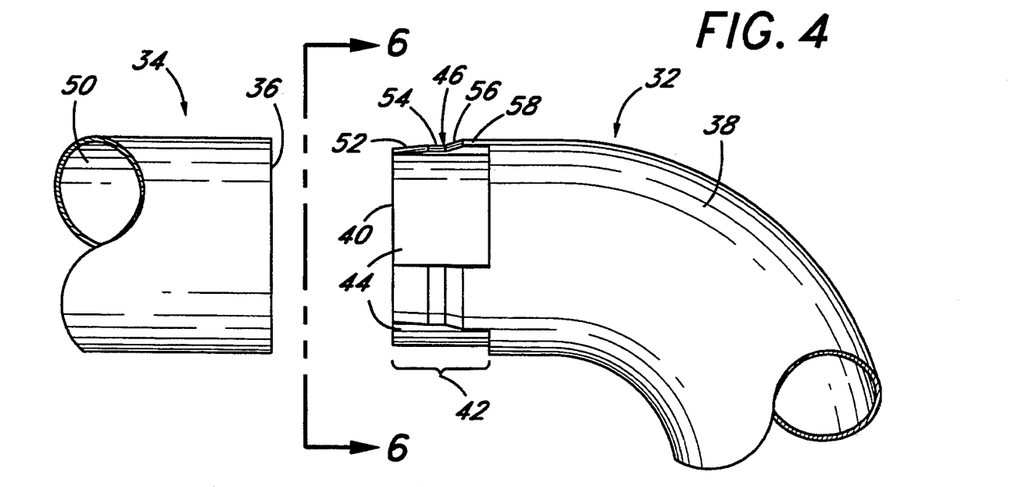
FIG. 4 is an exploded side view of the telescopic joint of FIG. 1.
Figure 5:
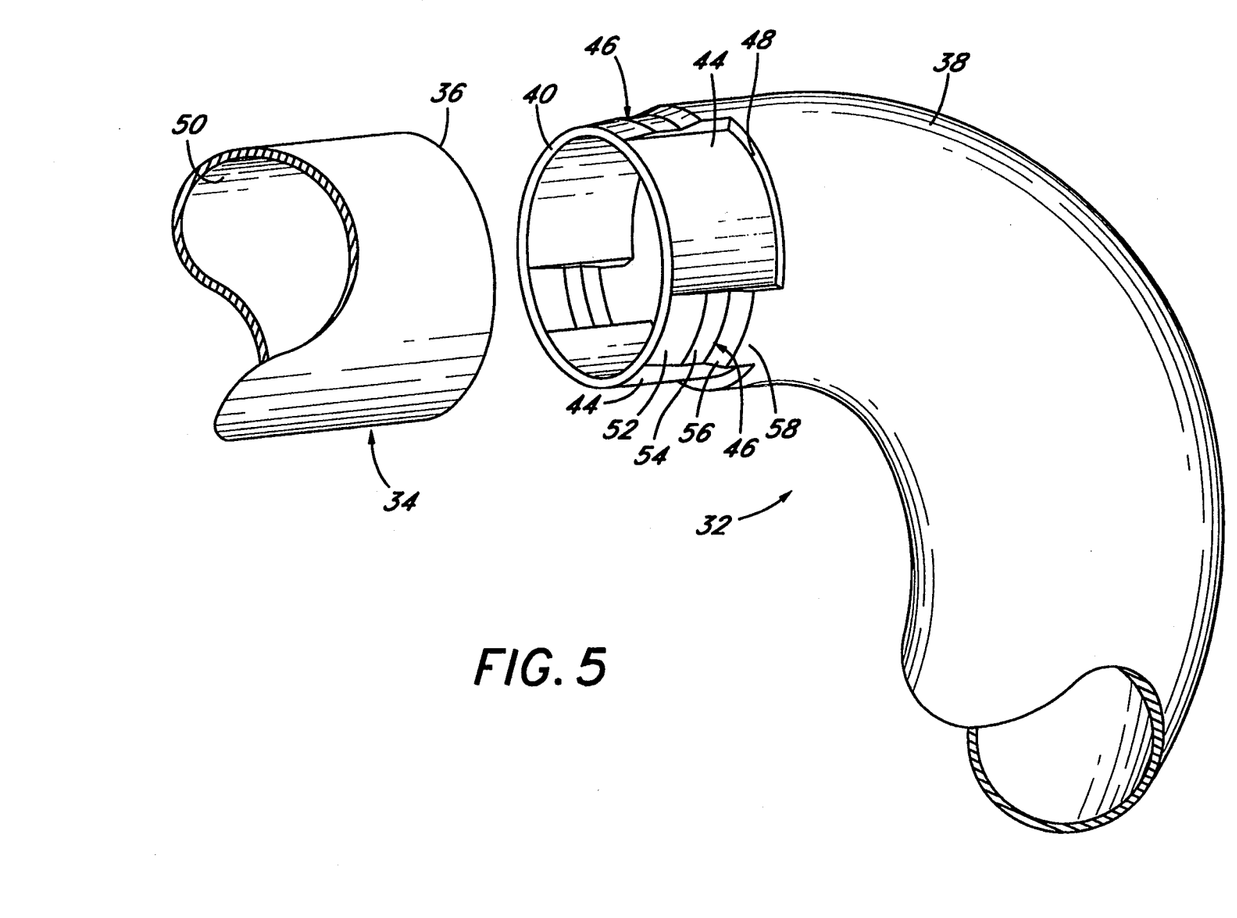
FIG. 5 is an exploded perspective view of the telescopic joint of FIG. 1.

Referring to FIGS. 4 and 5, the male member 32 generally comprises a body portion 38, a circular mouth or tip 40 at the distal end and a swaged region 42 between the mouth and the body. The distal mouth 40 inserts into the forward end 36 of the female member 34, and a substantial portion of the reduced diameter swaged region 42 slides within the female member to provide an overlap. The outside diameter of the female member 34 may be larger than that of the male member 32. Preferably, the inside diameter 50 of the female member 34 is between 0.004 and 0.010 inches greater than the reduced diameter swaged region 42 inserted therein. More preferably, the inside diameter 50 of the female member 34 is 0.008 inches greater than the reduced diameter swaged region 42. With a concentric fit of the male member 32 within the female member 34, a desirable 0.004 clearance between the inside diameter 50 of the female member 34 and the swaged region 42 is consistent all the way around the joint 30.

Looking more closely at the swaged region 42, three reduced diameter clearance areas 44 are formed by an appropriate tool and encompass a majority of the region. The clearance areas 44 extend in a band around the swaged region 42, except for portions where there are outwardly extending bosses 46. An annular shoulder 48 provides a transition between the clearance areas 44 and the outer diameter of the body portion 38.

Figure 6:
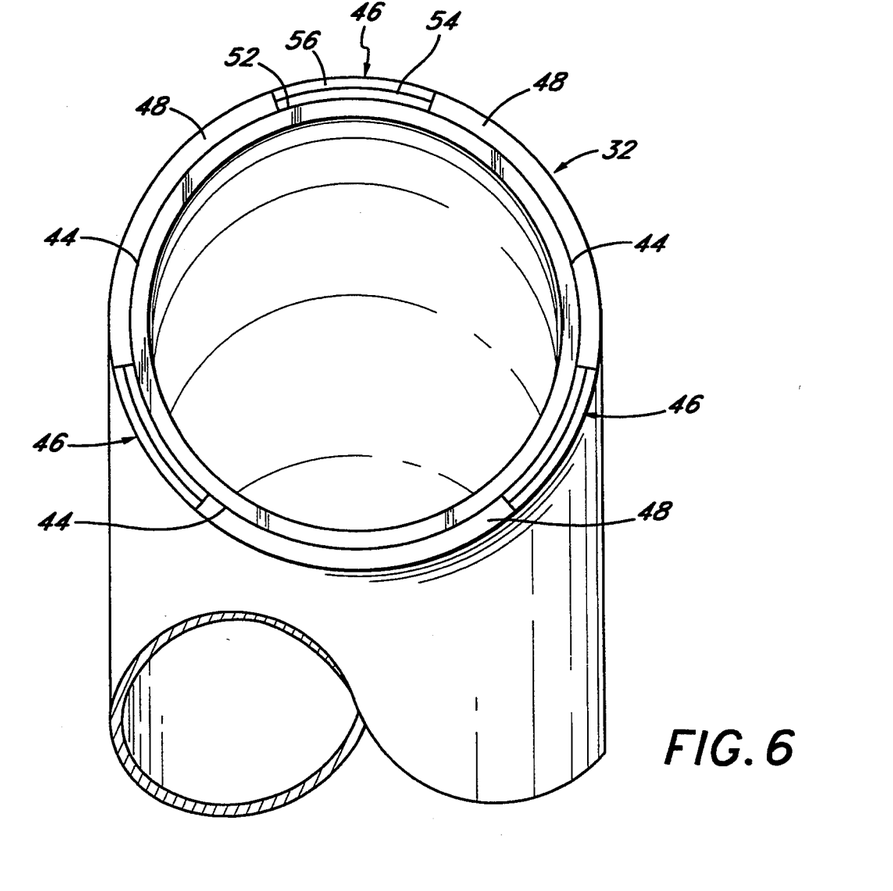
FIG. 6 is an end view of the male tube of the telescopic joint along lines 6—6 of FIG. 4.

Looking at the end view of FIG. 6, there are three evenly spaced bosses 46 around the circumference of the male member 32. The bosses 46 extend radially outward from the clearance areas 44, but do not protrude past the outer diameter of the body region 38. The bosses 46 are sized and shaped to contact the inner diameter 50 of the female member 34 and provide an advantageous spacing between the male and female members for ensuring the integrity of the brazed joint. The bosses 46 span the swaged region 42 in an axial direction between the mouth 40 and the annular shoulder 48.

Circles drawn tangentially connecting corresponding features on the bosses 46 define a series of stepped diameters from a minimum at the mouth 40 to a maximum at the body portion 38. In this regard, each boss 46 comprises a guide taper 52 adjacent the mouth 40 of the male member 32, a land 54, a stop taper 56 and a spacer bridge 58 directly adjacent the body portion 38. The mouth 40 of the male member 32 has an outside diameter equivalent to the diameter of the clearance areas 44, slightly less than the inner diameter 50 of the female member 34, as stated previously. A circle connecting the guide tapers 52 initially has the same diameter as the mouth 40 but gradually enlarges to the inner diameter of the female member 34 at the land end of the taper. A circle connecting the lands 54 also has a diameter equivalent to the inner diameter of the female member 34. From the lands 54, a circle connecting the stop tapers 56 widens to the outside diameter of the body portion 38. The spacer bridges 58 join the large end of the stop tapers 56 to the body portion 38 without a diameter change.

With reference to FIGS. 2 and 3, the female member 34 only comes into contact with the bosses 46 of the male member and no other portion. The bosses 46 thus control the advantageous fit between the two members 32, 34. Specifically, the female member 34 contacts the lands 54 and a short portion of the stop tapers 56, depending on the force used to fit the members together. The female member 34 is prevented from advancing any further by the increasing diameter of the stop tapers 56 and the spacer bridges 58. Thus, the forward end 36 of the female member 34 stops a certain distance from the annular shoulder 48, partially exposing the clearance areas 44. A small compressive force between the two members 32, 34 causes the female member to advance slightly onto the stop tapers 56, thus creating an interference fit for holding the two members together prior to the brazing operation. Preferably, the stop tapers 56 make an angle with the longitudinal axis of the male member 32 of between 5 and 15 degrees to allow the female member 34 to advance a short distance to an interference fit with the stop tapers.

The stop tapers 56 and bridges 58 must provide a sufficient mass of material to firmly stop the female member 34 without distorting or failing. In this respect, each boss 46 has a circumferential width of between 1/16 and 3/16 inches and preferably a width of ⅛ inch. In addition, the radial thickness of the stop taper 56 from the land 54 to the spacer bridge 58 is preferably between 0.004 inches and 0.009 inches, and more preferably the radial thickness is 0.006 inches.

The guide tapers 52 facilitate the smooth insertion of the male member 32 into the female member 34. The guide tapers 52 also align the female member 34 onto the lands 54 of the male member 32 and over the reduced clearance areas 44. Most importantly though, the guide tapers 52 provide a relief region 60 at the distal end of each boss 46 between the boss and the inner diameter 50 of the female member 34. This relief region 60 provides an avenue into which braze material may flow. In addition, the relief regions 60 provide communication between the clearance areas 44, thus allowing molten brazing material applied at one point around the periphery of the joint 30 to flow completely around the joint.

The brazing operation comprises pressing the two members 32, 34 together with a slight interference fit. The area of the joint 30 is then heated with, for instance, an acetylene torch. The members 32, 34 are heated to a temperature at which a high copper content brazing material, commonly in rod form (not shown) may melt upon application to the joint 30 and flow between the male member and the female member. The flow of the molten brazing material is dominated by capillary attraction forces within the thin gap between the two members 32, 34. Capillary attraction occurs when the forces between the solid and liquid molecules are greater than the forces between the liquid molecules themselves, as seen, for example, in the use of sponges.

The torch is not applied directly to the brazing rod and thus it is important that all areas over which the brazing material is to flow be heated to a temperature high enough to melt the brazing material. In particular, it is critical that the mouth 40 of the male member 32, which is farthest within the female member 34, be heated to the brazing rod melting temperature so that brazing material flows readily at this innermost region. The overlap of the female member 34 presents a heat shield over the covered portion of the male member 32, and thus it is advantageous to keep this overlap at a minimum. The protruding bosses 46 on the male member 32 of the present invention cause the female member 34 to stop at a predetermined minimum overlap which still conforms to industry standards regarding the eventual strength of the joint 30. The minimum overlap ensures the maximum amount of heat will penetrate to the covered portions of the male member 32.

The amount of overlap between the two members 32, 34 is equal to the axial length of the guide tapers 52 plus the lands 54. It is preferable that the total overlap be between three and six times the thickness of the thinnest member being joined to conform to industry guidelines for strength yet minimize the overlap and improve the molten flow of braze material within the joint 30. Additionally, it is preferable that the guide taper 52 make a shallow angle with the longitudinal axis of the male member 32 to provide an optimum volume of the relief region 60. To ensure this preferred geometry, the axial length of the guide taper 52 is approximately twice the axial length of the land 54. Thus, by mathematical deduction, the axial length of the guide taper 52 is preferably between two and four times the thickness of the thinnest member being joined.

Figure 7:
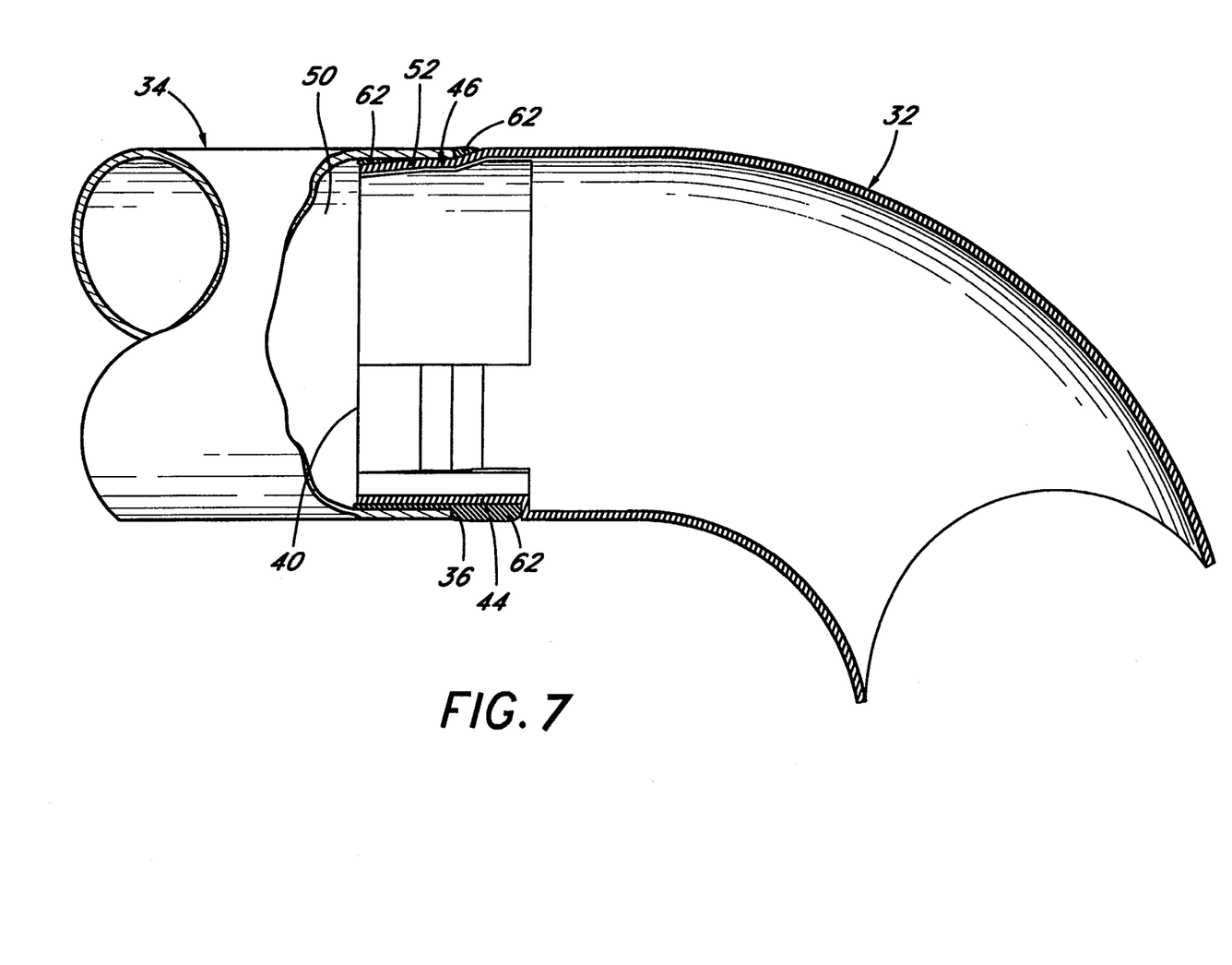
FIG. 7 is a partial cross-sectional view of the telescopic joint of FIG. 1 showing the profile of the brazing material both adjacent and between the bosses.

Referring to FIG. 7, a cross-section of the final shape of the brazing material 62 within the joint 30 is shown. There are two different cross-sectional shapes of the brazing material 62 around the male member 32, one proximate the clearance areas 44 and shown at the bottom, and the other proximate the bosses 46 as shown at the top. The brazing material 62 fills the annular space between the clearance areas 44 of the male member 32 and the inner diameter 50 of the female member. This annular space is advantageously held constant around the joint 30 by the concentric fit of the female member 34 as it contacts the bosses 46 of the male member 32. Looking at the top portion of FIG. 7, the braze material 62 fills the region 60 (FIG. 3) between the guide taper 52 of the bosses 46 on the male member 32 and the inner diameter 50 of the female member 34. In this manner, a continuous annular band of brazing material 62 flows into the most critical region of the joint 30; that is, the region directly adjacent the mouth 40 of the male member 32 and continuing for at least the width of the guide taper 52 towards the annular shoulder 48. Thus, a void-free barrier is formed by the brazing material 62 on the interior of the refrigeration coil such that no moisture may enter into the joint.

After the two members 32, 34 are brought together so that the female member rests on the stop tapers 56 of the male member, the forward edge 36 of the female member is separated from the annular shoulder 48 of the male member by the spacer bridges 58 and a portion of the stop tapers. This gap allows the tip of the brazing rod to easily insert therein. The ease of insertion of the brazing rod speeds up the brazing process, resulting in a minimum of cooling of the joint area. Additionally, the brazing rod contacts the exposed clearance areas 44, and possibly the annular shoulder 48 and forward end 36 of the female member 34, thus conducting a substantial amount of heat energy to the rod and quickly melting a large quantity of material 62 which then flows into the joint 30. The gap between the annular shoulder 48 and forward end 36 of the female member 34 is preferably slightly wider than the diameter of brazing rod used.

Typical refrigeration tubing comprises copper tubes with an outside diameter of ½ inch. The wall thickness of the tubing is 0.016 inches. In other embodiments, the tubing may have an outside diameter of ⅜ inches with a 0.016-inch wall thickness, or an outside diameter of ⅝ inches with a 0.020-inch wall thickness. There are preferably three bosses 46 evenly spaced around the perimeter of the swaged region 42 of the male member 32, but other arrangements and numbers are contemplated.

In one embodiment of the present tube joint with ½-inch diameter, 0.016 inch thick tubing, the male member 32 is swaged to a reduced diameter at the end of 0.480 inches. The female member 34 is typically expanded to contact sleeves of the external cooling fins and thus has an inside diameter of 0.488 inches. Therefore, the radial clearance is 0.004 inches between the inside diameter of the female member and the reduced region of the male member 32. Three bosses 46 span ⅛ inch in circumferential arc each and have a radial height at the spacer bridge 58 of 0.010 inches. The guide taper 52 extends axially approximately 1/16 inch from the mouth 40 and the land 54 extends 1/32-inches axially farther, resulting in an overlap of 0.094 inches or 5.86 times the thickness of the tubes. The stop taper portion 56 spans 1/32-inch axial length and the spacer bridge 58 extends 3/64-inches farther resulting in a total axial span of the bosses 46 of 11/64 inches.

The present invention provides a means for locating the male member 32 within a female member 34 concentrically, provides a means for binding the two parts together prior to brazing, limits the overlap of the two tubes to ensure proper heat conduction to the inner end of the male member, and most importantly, ensures a continuous volume for brazing material to flow at the innermost end of the male member proximate the mouth 40. The present invention is described in the environment of brazing two tubular members together, but the preferred control of the relative position between the two members may be applied to other environments. For example, the joining means may be by soldering, welding, gluing etc. Additionally, the cross-sectional shape of the two members is not restricted to the circular embodiment shown. For instance, the swaged region 42 and bosses 46 of the present invention may be formed on the four sides of the end of a square pipe to be fitted within another square pipe and be welded together. The advantageous positioning provided by the present invention is thus suited for numerous joining applications requiring an even and continuous filler around the joint.

What is claimed is:

1. A tube joint comprising:
a female tube having an open end,
a male tube having an area of reduced exterior diameter at one end and fitting within said female tube to create an axial overlap, and
radially outwardly extending bosses spaced around said reduced area, the bosses providing the sole contact between said tubes,
each of said bosses having one or more surfaces adjacent said female tube open end to limit the axial overlap between the tubes, to create an annular radial space between a mouth of said male tube and the interior of said female tube, and to allow the two tubes to be pressed together in an interference fit.

2. A tube joint comprising:
a female tube,
a male tube having an area of reduced diameter at one end sized smaller than both the interior of said female tube and an outside diameter of said male tube, and
radially outwardly extending bosses spaced around said reduced area which provide sole contact between said tubes,
said bosses including a guide taper beginning at the end of the male tube and tapering radially outwardly to a land for radially supporting said female member, and
a stop taper tapering from said land radially outwardly for axially restricting the insertion of the male tube into the female tube.

3. The joint of claim 2, wherein said bosses also include a bridge which joins said stop taper to the outside diameter portion of said male tube and has an outer surface aligned with the outer diameter of said outside diameter portion, wherein said bridge creates an axial gap between said female member and said outside diameter portion partially exposing said reduced area.

4. The joint of claim 3, wherein the combined axial length of said guide taper and said land is between three and six times the thickness of the thinnest tube being joined.

5. The joint of claim 4, wherein the axial length of said guide taper is twice the axial length of said land.

6. The joint of claim 5, wherein said lands have a radial height of between 0.002 and 0.005 inches from said reduced area.

7. The joint of claim 6, wherein said bridges have a radial height of between 0.009 and 0.011 inches.

8. The joint of claim 1, wherein said male tube has a U-shape with an area of reduced diameter at each end adapted to fit with ends of said female tubes.

9. A tube joint for a refrigeration coil comprising:
an outer tube;
an inner tube having an end section which fits within an end section of said outer tube to create an axial overlap; and
engaging portions on said tubes that axially limit said overlap, said portions and said sections being configured to provide a space between said sections sized to facilitate the flow of molten brazing material into said space, said space including an annular portion surrounding a mouth of said inner tube end section so that the brazing material can completely surround said mouth to obtain a good seal between said sections in that area.

10. The joint of claim 9, wherein said end sections are further configured to provide circumferentially extending relief areas in said inner tube section adjacent a mouth of said outer tube end section for receiving and providing an unrestricted flow path for said molten brazing material into said space.

11. A tube joint for a refrigeration coil comprising:

an outer tube;

an inner tube having an end section which fits within an end section of said outer tube to create an axial overlap; and engaging portions on said tubes that axially limit said overlap, said portions and said sections being configured to provide a space between said sections sized to facilitate the flow of molten brazing material into said space, said space including an annular portion surrounding a mouth of said inner tube end section so that the brazing material can completely surround said mouth to obtain a good seal between said sections in that area, wherein said engaging portions include a plurality of circumferentially spaced bosses that have tapered surfaces that axially limit the overlap of said tube and provide an interference fit between the tubes.

12. A tube joint for a refrigeration coil comprising:
an outer tube;
an inner tube having an end section which fits within an end section of said outer tube to create an axial overlap; and engaging portions on said tubes that axially limit said overlap, said portions and said sections being configured to provide a space between said sections sized to facilitate the flow of molten brazing material into said space, said space including an annular portion surrounding a mouth of said inner tube end section so that the brazing material can completely surround said mouth to obtain a good seal between said section in that area, wherein said engaging surfaces include at least three radially extending circumferentially spaced bosses on one of said tube end sections, said bosses including tapered portions which guide the inner tube into the outer tube, and further including lands which define a cylinder which mates snugly with the other one of said tube end sections.

13. A tube joint for a refrigeration coil comprising:
an outer tube;
an inner tube having an end section which fits within an end section of said outer tube to create an axial overlap; and engaging portions on said tubes that axially limit said overlap, said portions and said sections being configured to provide a space between said sections sized to facilitate the flow of molten brazing material into said space, said space including an annular portion surrounding a mouth of said inner tube end section so that the brazing material can completely surround said mouth to obtain a good seal between said section in that area, wherein said engaging portions include at least three radially upstanding bosses spaced peripherally around said inner tube, each of said bosses including a guide taper for guiding said tube sections together, said taper extending axially to an untapered land, said lands defining a cylinder which fits snugly within said outer tube.

14. The joint of claim 13, wherein each of said bosses includes a stop tapering radially outwardly from said land to axially restrict the telescoping of said tubes and to provide said interference fit.

15. A method of making a tube joint for a refrigeration coil, comprising:
inserting the end of an inner tube into the end of an outer tube to create an axial overlap;

forming engaging portions on said tube ends that concentrically position the end of the inner tube within the end of the outer tube and create a space in the overlap area for receiving molten brazing material, said space including an annular portion surrounding a mouth of said inner tube so that the brazing material can completely surround the mouth and form a fluid tight seal between the tube ends; and axially limiting the insertion of the inner tube into the outer tube to limit the axial overlap between the tubes to a predetermined amount sufficient to withstand the internal pressure to which the tubes will be subjected during use.

16. The method of claim 15, wherein said forming includes reducing the diameter of the end of said inner tube to a size smaller than the interior of the outer tube and forming radially outwardly extending bosses around said reduced area to control the contact between the tubes; and said restricting includes forming a tapered stop on each of said bosses that frictionally interferes with the insertion of the inner tube within the outer tube.

17. A method of joining the ends of two tubes comprising the steps of:
reducing the diameter of an end of a male tube to a size smaller than the interior of a female tube and smaller than an outside diameter portion of the said male tube adjacent said area, forming radially outwardly extending bosses spaced around said reduced area to control the contact between said tubes, forming a guide taper on each of said bosses beginning at the mouth of said male tube and tapering radially outwardly to a land, the land defining a cylinder having a diameter sized to snugly fit within said female tube, inserting the male tube end into the female tube so that said lands radially support said female member, axially restricting the insertion of the male tube into the female tube to control the axial overlap between the tubes by means of a stop taper on said bosses beginning from said land and tapering radially outwardly creating an axial gap between said female member and said male tube outside diameter portion partially exposing said reduced area by means of a bridge on said bosses which joins said stop taper to the outside diameter portion of said male tube and has an outer surface aligned with outside diameter portion, said inserting step including pressing the two tubes together so that the female member rides slightly into the stop taper to provide an interference fit, applying heat to the two tube ends sufficient to melt a brazing rod, and touching said brazing rod to said reduced area exposed by said axial gap to melt the rod and allow molten brazing material to flow between said tubes completely filling any space between tubes in said overlap.

18. In a tube joint, a male tube having an end for mating with a female tube, the male tube comprising:
an area of reduced diameter at one end sized smaller than the inside diameter of the female tube, radially outwardly extending bosses spaced around said reduced area, each of said bosses having one or more surfaces adapted to engage spaced portions of an end of said female tube to limit an axial overlap between said tubes, to create an annular radial space between a mouth of said male tube and the female tube, and to allow said tubes to be pressed together in an interference fit.

19. A tube joint comprising:

a female tube;

a male tube having an end portion positioned within said female tube to create an axial overlap area, the outer diameter of said male tube at a mouth of the end portion being spaced from the interior of a surrounding portion of the female tube to create an annular gap;

bosses spaced circumferentially between said tubes in said overlap area to support the end portion of the male tube in the female tube; and spaced tapered surfaces adjacent a mouth of the female tube to limit the axial overlap between the tubes while maintaining the annular gap.

* * * * *